United States Patent [19]

Kim

[11] Patent Number: 5,446,356
[45] Date of Patent: Aug. 29, 1995

[54] MOBILE ROBOT

[75] Inventor: Sang-Gwon Kim, Suwon, Rep. of Korea

[73] Assignee: Samsung Electronics Co., Ltd., Suwon, Rep. of Korea

[21] Appl. No.: 301,395

[22] Filed: Sep. 8, 1994

[30] Foreign Application Priority Data

Sep. 9, 1993 [KR] Rep. of Korea ............. 93-18152

[51] Int. Cl.⁶ .............................................. H02J 7/00
[52] U.S. Cl. .................................. 318/587; 318/568.1; 901/1; 364/424.02
[58] Field of Search ............... 318/560–669; 364/424.02, 424.06, 426; 395/80–99; 901/1; 180/166–169

[56] References Cited

U.S. PATENT DOCUMENTS

| | | | |
|---|---|---|---|
| 4,701,893 | 10/1987 | Muller et al. | 367/87 |
| 4,710,020 | 12/1987 | Maddox et al. | 901/1 |
| 4,736,116 | 4/1988 | Pavlak, Jr. et al. | 307/9 |
| 4,751,658 | 6/1988 | Kadonoff et al. | 901/1 X |
| 4,772,875 | 9/1988 | Maddox et al. | 901/1 X |
| 4,777,416 | 10/1988 | George, II et al. | 318/568 |
| 4,815,008 | 3/1989 | Kadonoff et al. | 364/424.02 |
| 4,815,840 | 3/1989 | Benayad-Cherif et al. | 901/1 X |
| 4,829,442 | 5/1989 | Kadonoff et al. | 364/449 |
| 4,962,453 | 10/1990 | Pong et al. | 364/424.02 |

Primary Examiner—Paul Ip
Attorney, Agent, or Firm—Burns, Doane, Swecker & Mathis

[57] ABSTRACT

A self-propelled robot for performing jobs while travelling along a route, and more particularly to a mobile robot for correcting a position error generated in the course of movement of the robot to movably control the robot to a targeted area, including a control unit; a driving unit for moving the robot according to control of the control unit; an infrared signal transmitting-/receiving unit for transmitting and/or receiving an infrared signal during travel of the robot according to the driving unit; a position correcting unit for receiving the infrared signal from the infrared signal transmitting-/receiving unit to output an intrinsic code signal to the infrared signal transmitting/receiving unit, so that a position error data generated during the travel of the robot can be corrected by a predetermined position coordinate data; and a distance detecting unit for detecting a separated distance from the position correction unit to output a separted distance data detected therefrom to the control unit, so that the position error can be corrected.

9 Claims, 6 Drawing Sheets

MOBILE ROBOT

BACKGROUND OF THE INVENTION

1. Field of the Invention

The present invention relates to a self-propelled mobile robot which travels along a studied route to perform a cleaning or a monitoring job, and more particularly to a mobile robot which can correct a position error generated in the course of travel of the robot, thereby controlling the same movably to a targeted point accurately.

2. Description of the Prior Art

As a prior art, a conventional robot is disclosed, wherein a pulse signal is generated from an encoder according to revolution of running motor attached to a powered wheel to detect a travel distance of the robot, and a rotary angle measuring an amount of revolution of the robot is accumulated to detect a travel direction change of the robot.

Accordingly, travel distance data detected by the encoder and travel direction data detected by an angular velocity sensor are received by a control means, to thereby perform an operation based on a position of the robot.

However, in the case of the conventional robot thus constructed, slippage is generated at a driving wheel of the robot according to a material and condition of the floor surface on which the robot travels, so that travel by the robot is detected by the encoder even though the robot has not actually moved, causing a problem in that the robot cannot be shifted to a targeted point accurately.

Furthermore, the angular velocity sensor for detecting the travel direction change of the robot produces an output error according to ambient temperatures, vibrations and other changes of surroundings.

AS noted above, when an output error of angular velocity against the travel direction change detected by the angular velocity sensor arises, correction of the output error in the angular velocity sensor should be made by way of an absolute position display device, a magnetic azimuth sensor or the like, thereby causing a problem in that the structure thereof becomes complicated, and correction thereof takes considerable time.

Accordingly, the present invention has been disclosed to solve the aforementioned problems and it is an object of the present invention to provide a mobile robot which can correct position error data generated during travel of the robot by a predetermined position coordinate data to thereby move the robot to a targeted point accurately and at the same time to provide a mobile robot which can be easily installed due to its simple structure to thereby reduce the manufacturing cost.

It is another object of the present invention to provide a mobile robot which can correct the position error data only when an infrared signal transmitted from the robot is received, thereby reducing electric power consumption necessary for position error correction of the robot.

SUMMARY OF THE INVENTION

In accordance with the object of the present invention, there is provided a mobile robot for travelling on a studied route to perform a tusk, the mobile robot comprising: a control means; a driving means for moving the robot according to control of the control means; an infrared signal transmitting/receiving means for transmitting and/or receiving the infrared signal during travel of the robot according to the driving means; a position correction means for receiving the infrared signal from the infrared signal transmitting/receiving means to output an intrinsic code signal to the infrared signal transmitting/receiving means, so that the position error data generated during the travel of the robot can be corrected by a predetermined position coordinate data; and a distance detecting means for detecting a separated distance from the position correction means in order to output a separated distance data detected therefrom to the control means, so that the position error can be corrected.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

An embodiment of the present invention will be described in detail with reference to the accompanying drawings.

Figure 1:
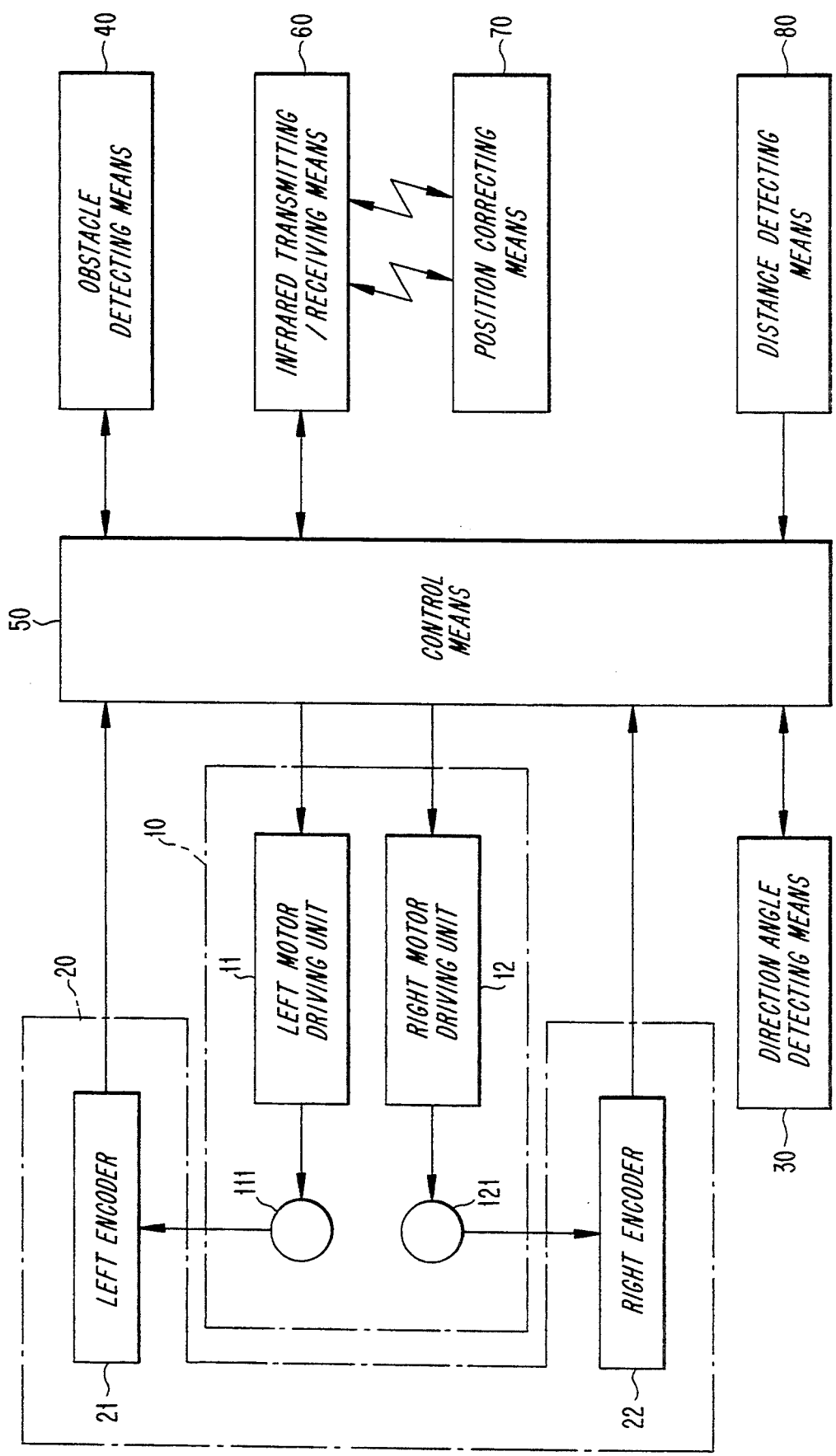
FIG. 1 is a block diagram for illustrating control of the mobile robot according to an embodiment of the present invention.
Figure 2:
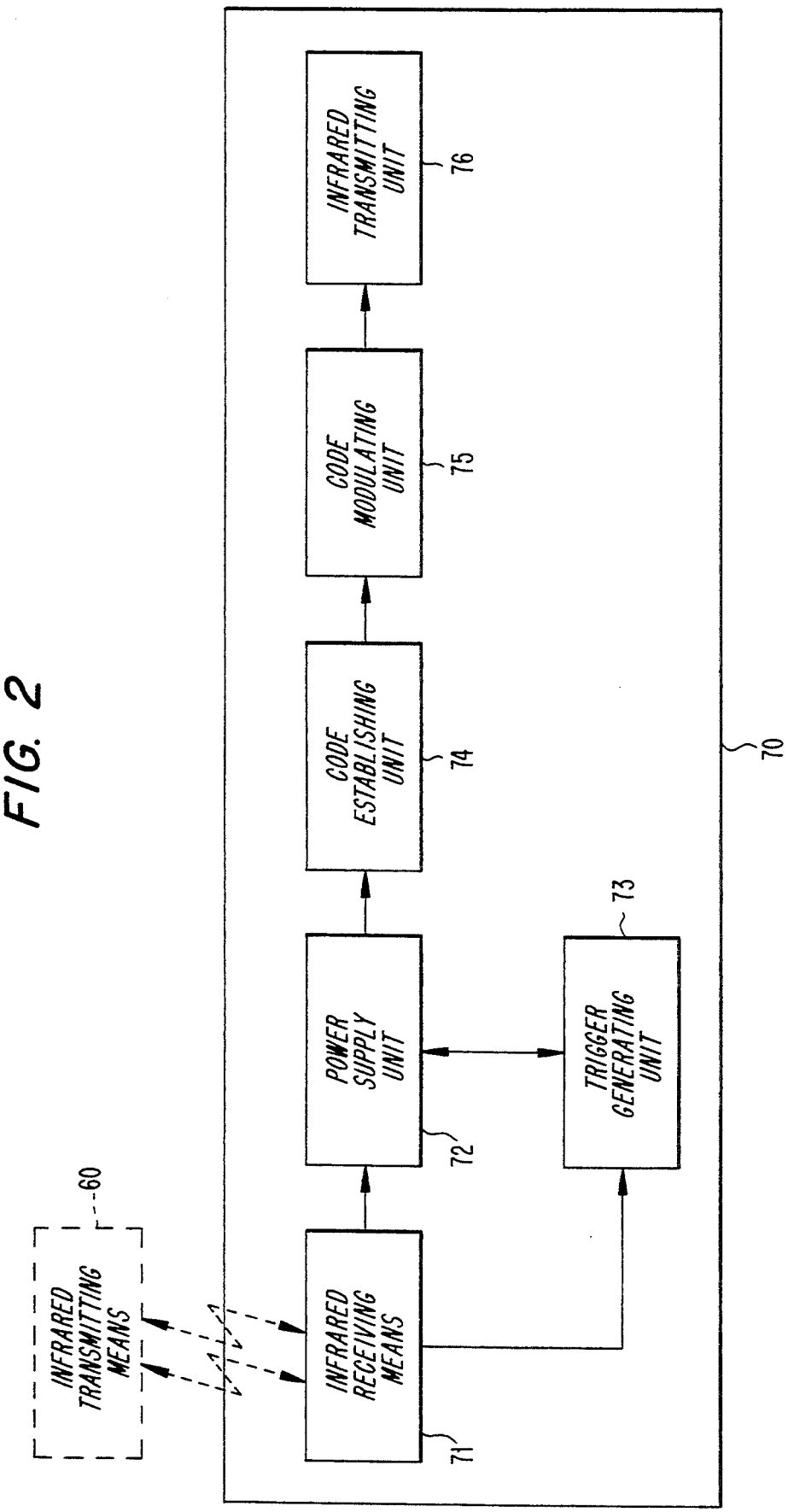
FIG. 2 is a block diagram for illustrating control of the position correction means applied to the present invention.
Figure 3:
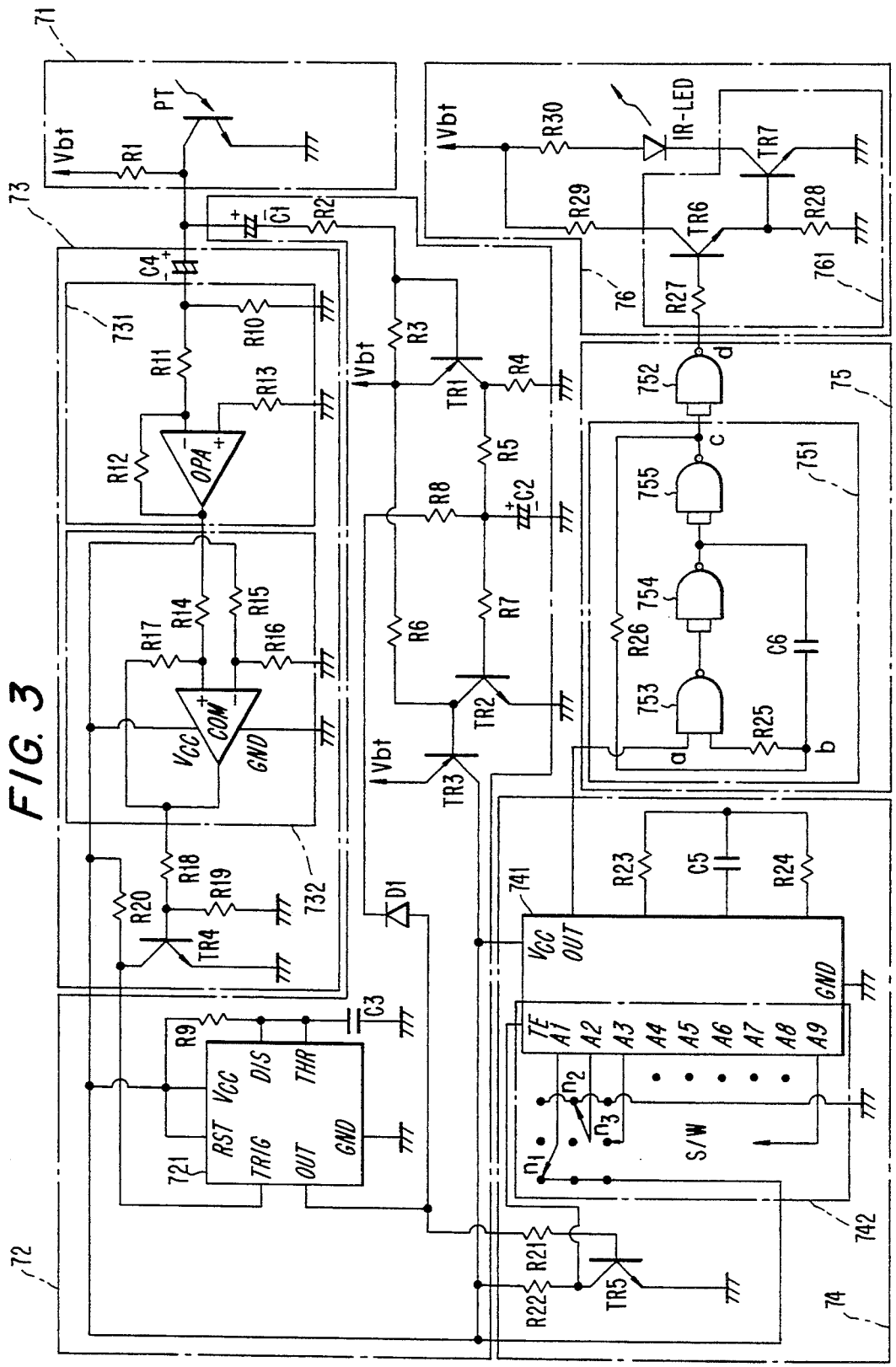
FIG. 3 is a circuit diagram in detail of the position correction means applied to the present invention.

As illustrated in FIGS. 1, 2 and 3, the driving means 10 controls movement of the robot, the means comprising: a left motor driving unit 11 for driving a left travel motor 111, so that the robot can be moved to the right; and a right motor driving unit 12 for driving a right travel motor 121, so that the robot can be moved to the left.

The left and right travel motors 111 and 112 are attached to powered wheels (not shown) respectively.

A travel distance detecting means 20 detects a travel distance of the robot moved by the driving means 10, the means comprising: a left encoder for generating a pulse signal proportionate to revolution of the left travel motor 111 driven by the left motor driving unit 11 to thereby detect the travel distance of the motor moving to the right side; and a right encoder 22 for generating a pulse signal proportionate to revolution of the right travel motor 121 driven by the right motor driving unit 12 to thereby detect the travel distance of the robot moving to the left side.

Furthermore, a direction angle detecting means 30 detects a travel direction change of the robot moved by the driving means 10, which detects a rotary angular velocity of the robot according to a voltage level varying in the revolution of the robot moved by the driving means, to thereby play the part of an angular velocity sensor such as a gyro sensor for detecting the travel direction changes.

An obstacle detecting means 40 generates an ultrasonic wave through an ultrasonic wave sensor disposed at a front, left or right side of the robot moved by the driving means 10 and receives a signal generated by the ultrasonic wave reflected by a wall surface or an obstacle, that is, an echo signal, to thereby detect a distance to the obstacle disposed along a travel route of the robot and to detect whether or not there is an obstacle along the route.

The control means 50 is a Central Processing Unit CPU which receives travel distance data detected by the travel distance detecting means 20 and travel direction data detected by the direction angle detecting means 30 at a predetermined time interval to thereby perform an operation on a present position of the robot, and receives data on the obstacle and a wall surface (Ws) detected by the obstacle detecting means 40 to thereafter perform an operation based on a distance to the obstacle located in the front, left or right side of the robot and to control the travel route of the robot according to information result therefrom, so that the robot is not deviated from a normal track to thereby travel to the targeted point accurately along the wall surface (Ws).

An infrared transmitting/receiving means 60 transmits or receives the infrared signal in the course of the travel of the robot by way of the driving means 10.

Furthermore, a position correcting means 70 shown in FIG. 1 receives the infrared signal transmitted from the infrared transmitting/receiving means 60 to output an intrinsic code signal to the infrared transmitting-/receiving means 60, so that the position data error generated during the travel of the robot can be corrected by the predetermined position coordinate data.

The position correcting means 70, as illustrated in FIG. 2, comprises: an infrared receiving unit 71 for receiving the infrared signal transmitted from the infrared transmitting/receiving means 60; a power supply unit 72 for supplying electric power according to the infrared signal received at the infrared receiving unit 71; a trigger generating unit 73 for generating a trigger signal according to the infrared signal received at the infrared receiving unit 71; a code establishing unit 74 for receiving a voltage supplied from the power source unit 72 to thereby output an intrinsic code data of the position correcting means 70 predetermined by a user; a code modulating unit for modulating the intrinsic code data output from the code establishing unit 74, so that the data can be transmitted a long distance with low consumption of electricity; and an infrared transmitting unit 76 for receiving and amplifying the intrinsic code signal modulated by the code modulating unit 75 to thereby transmit the amplified intrinsic code signal to the infrared transmitting/receiving means.

A distance detecting means 80 detects a distance of separation between the robot and the wall surface (Ws) where the position correcting means 70 is disposed to thereby output a separated distance data detected therefrom to the control means, so that the robot can maintain a predetermined distance from the wall surface (Ws) to correct the position error.

Meanwhile, the infrared receiving unit 71 of the position correcting means 70, as illustrated in FIG. 3, comprises a photo-transistor PT which can be turned on by receiving the infrared signal transmitted from the infrared transmitting/receiving means 60; and a resistor R1 for limiting an overcurrent caused by a battery voltage Vbt intrinsically stored for protection of the photo-transistor PT during activation of the same.

Furthermore, the power supply unit 72 of the position correcting means 70 comprises: a capacitor C1 for filtering a direct current component contained in the battery voltage Vbt during activation of the photo-transistor PT of the infrared receiving unit 71; a transistor TRI which can be turned on by receiving through a resistor R2 the voltage filtered by the capacitor C1; a capacitor C2 which can be charged by receiving through a resistor R5 the battery voltage Vbt during activation of the transistor TRI; a transistor TR2 which can be turned on by receiving through a resistor R7 the voltage charged at the capacitor C2 during activation of the transistor TR1; a transistor TR3 which can be turned on by receiving through a resistor R6 the battery voltage Vbt during activation of the transistor TR2; a multivibrator 721 for receiving the battery voltage Vbt at a power source terminal Vcc during activation of the transistor TR3 and simultaneously for receiving a pulse signal output from a trigger generator (explained later) at a trigger terminal Trig to thereby generate a rectangular wave signal; a resistor R9 and a capacitor C3 for determining an oscillating frequency of the multivibrator 721: a diode D1 for performing a half-wave rectification on the rectangular wave signal generated from the multivibrator 721; and a resistor R8 for limiting the current component contained in the rectangular wave signal half-wave rectified by the diode D1 to thereby be serially connected to the diode D1.

The trigger generator 73 of the position correcting means 70 comprises: a capacitor C4 for filtering the direct current component containable by outside noises such as sunshine or an artificial light source during activation of the phototransistor PT of the infrared receiving unit 71; an amplifying circuit 731 for amplifying the voltage filtered by the capacitor C4; a comparative circuit 732 for receiving the voltage amplified by the amplifying circuit 731 and a reference voltage from the power supply unit 72 to thereafter compare the same; and a transistor TR4 for receiving through partial pressure resistors R18 and R19 the voltage compared at the comparative circuit 732 to thereby be rendered conductive.

The amplifying circuit 731 of the trigger generator 73 comprises: an operational amplifier OPA for amplifying the voltage filtered by the capacitor C4 by receiving the same at an inversion terminal (−) through partial pressure resistors R10 and R11; a resistor R12 for feeding back the voltage amplified at the operational amplifier OPA to the inversion terminal (−) of the operational amplifier OPA; and a resistor R13 for establishing a voltage at a non-inversion terminal (+) of the operational amplifier OPA.

The comparative circuit 732 of the trigger generator 73 comprises: a comparator COM for receiving the voltage amplified by the amplifying circuit 731 at a non-inversion terminal (+) through a resistor R14 and simultaneously for receiving voltage Vcc from the power supply unit 72 at the inversion terminal (−) through partial pressure resistors R15 and R16 to thereby compare the same, so that it can be discriminated whether or not the signal received from the infrared receiving unit 71 is the infrared signal; and a resistor R17 for feeding back the signal compared from the comparator COM to the non-inversion terminal (+).

The code establishing unit 74 of the position correcting means 70 comprises: a transistor TR5 which can be rendered conductive by receiving a rectangular wave signal output from an output terminal OUT of the multivibrator 721 in the power supply unit 72 through a resistor R21; a code establisher 741 for receiving the battery voltage Vbt at a transmission start terminal TE through a resistor R22 during activation of the transistor TR5 to thereby output a code pulse signal through the output terminal OUT according to the intrinsic code data previously established by the user at code establishing terminals (A1–A9); and resistors R23 and R24 and a capacitor C5 for determining the oscillating frequency of the code establisher 741.

The code modulating unit 75 of the position correcting means 70 comprises an oscillator 751 for modulating a code pulse signal output from the output terminal OUT of the code establishing unit 74, so that the signal can be transmitted to a long distance at a low electric consumption; and a buffer NAND gate 752 for inverting the output pulse of the oscillator 751.

The oscillator 751 of the code modulating unit 75 comprises: NAND gates 753, 754 and 755 for inverting the code pulse signal output from the code establisher 741; a resistor R26 and a capacitor C6 for determining an oscillating frequency of the oscillator 741; and a protective resistor R25 of the NAND gate 753.

Furthermore, the infrared transmitting unit 76 of the position correcting means 70 comprises: a Darlington circuit 761 for receiving the intrinsic code signal modulated at the code modulating unit 75 to thereby amplify the same; and an infrared diode IR-LED for generating light by receiving the battery voltage Vbt through a resistor R30 during operation of the Darlington circuit 761.

The Darlington circuit 761 of the infrared transmitting unit 76 comprises: a transistor TR6 which can be rendered conductive by receiving the intrinsic code signal output from the code modulating unit 75 through a resistor R27 when the signal is in high level; and a transistor TR7 which can be rendered conductive by receiving the battery voltage Vbt through partial pressure resistors R28 and R29 when the transistor TR6 is rendered conductive.

Figure 5:
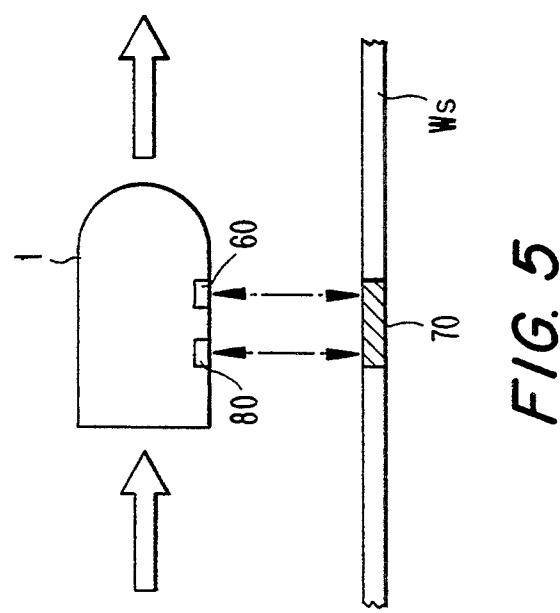
FIG. 5 is a schematic drawing for explaining a transmitting/receiving state of the position correction means and the mobile robot according to an embodiment of the present invention.
Figure 4:
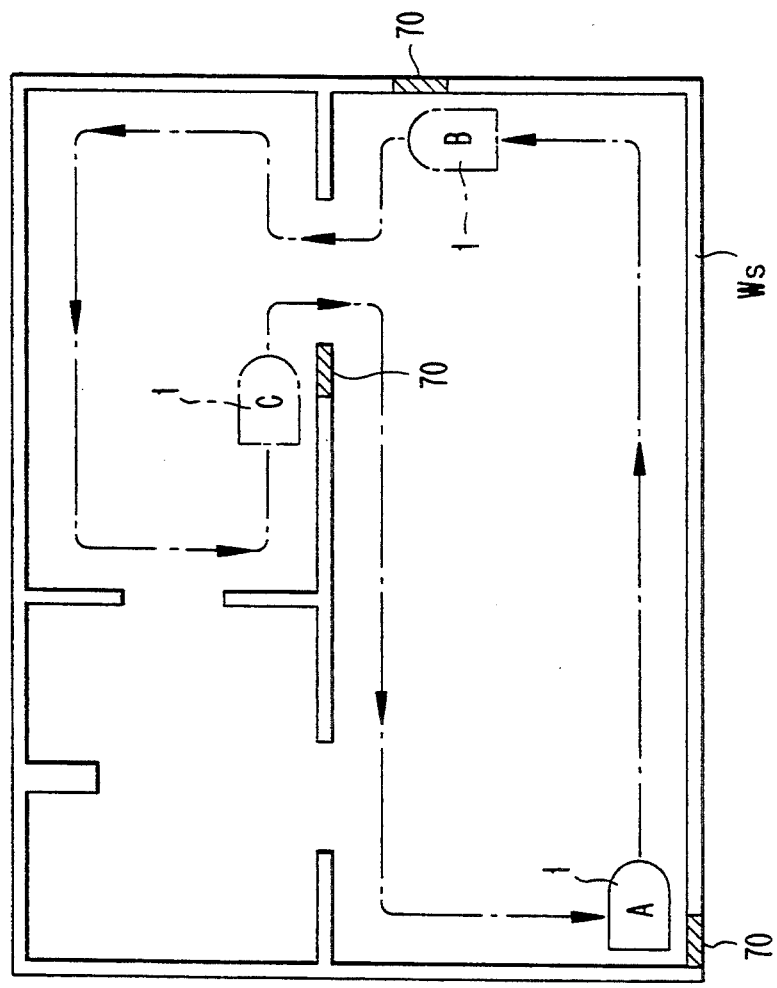
FIG. 4 is a schematic drawing for explaining travel of the mobile robot according to an embodiment of the present invention.

Reference numeral 1 is a body of the robot in FIGS. 4 and 5.

Next, the operating effect of the mobile robot thus constructed will be described.

First of all, when the user turns on an operation switch disposed at a predetermined position on the robot 1, the control means 50 initializes the robot 1 according to a travel operation function thereof to thereby output a control signal to the driving means 10.

Accordingly, the control signal output from the control means 50 is received at the left motor driving unit 11 and the right motor driving unit 12 to thereby drive the left travel motor 111 and the right travel motor 121, so that the robot 1 can start travelling, as illustrated in FIG. 4.

Meanwhile, the infrared transmitting/receiving means 60 disposed at one side of the robot 1 keeps transmitting or receiving the infrared signal.

At this time, the left encoder 21 generates a pulse signal proportionate to the revolution of the left powered wheel according to driving of the left travel motor 111 to thereafter output the same to the control means 50, and the right encoder 22 generates a pulse signal proportionate to the revolution of the right powered wheel according to drive of the right travel motor 121, thereby outputting the same to the control means 50.

Therefore, the control means 50 receives the pulse signal output from the left and right encoders 21 and 22 to calculate a travel distance run by the robot.

Meanwhile, the direction angle detecting means detects a rotary angular velocity of the left/right powered wheels according to a drive of the left and right travel motor 111 and 121 to thereby output rotary angular data detected therefrom to the control means 10.

Accordingly, the control means integrates the rotary angular data detected by the direction angle detecting means 30 against time, to thereby detect a travel direction change of the robot 1, so that the robot 1 cannot be deviated from the normal track to travel to the targeted point along the wall surface (Ws) by way of control from the left and right motor driving units 11 and 12.

In other words, the control means 50 receives the travel distance data of the robot 1 detected by the travel distance detecting means 20 and the travel direction data detected by the direction angle detecting means 30 to thereby operate on the present position of the robot 1, and to control the movement of the robot 1 to an optimum condition according to a result operated therefrom.

Likewise, the obstacle detecting means 40 generates ultrasonic waves to the left, right or the front of the moving robot during travel thereof according to a drive of the left and right travel motors 111 and 121, and receives echo signals of the generated ultrasonic waves reflected from the obstacle, or the wall surface, thereby detecting a distance to the obstacle or whether or not there is any obstacle on the travel route of the robot and outputting the same to the control means 50.

Accordingly, the control means discriminates which direction is nearer to the obstacle between the left and right direction when the robot 1 faces toward the front thereof, controls a pulse width of the left and right travel motors 111 and 121 and rotatively moves the robot 1 to avoid a collision with the obstacle.

According to the control thus described, when the robot 1 reaches a point (A, B or C) where the position correcting means 70 is disposed during its movement, as illustrated in FIG. 4, the infrared signal transmitted from the infrared transmitting/receiving means 60 is received by the infrared receiving unit 71 of the position correcting means 70 as illustrated in FIG. 5.

The infrared receiving unit 71, therefore, is rendered conductive by receiving at the photo-transistor PT the infrared transmitted from the infrared signal transmitting/receiving means 60.

When the photo-transistor PT is rendered conductive, the transistor TR1 is rendered conductive and the capacitor C2 is charged through a resistor R5 because a base current flows in the transistor TR1 charged with a minute current when the battery voltage Vbt is under a waiting state.

At this time, the voltage charged in the capacitor C2 is supplied to the transistor TR2 to thereby render the transistor TR2 conductive and also render the transistor TR3 conductive.

When the transistor TR3 is rendered conductive, the battery voltage Vbt is respectively supplied to the multivibrator 721 of the power supply unit 72, the comparator COM of the trigger generator 73 and the code establisher 741 of the code establishing unit 74, which in turn activates the position correcting means 70 only when the infrared signal is received from the infrared transmitting/receiving means 60, thereby prolonging longevity of the power supply source.

When a predetermined interval of infrared signal is received according to the infrared transmitting/receiving means 60 of the robot 1, the photo-transistor PT is rendered conductive or inconductive according to the predetermined interval thereof, which in turn causes the capacitor C4 to conduct the charging and discharging.

At this time, because the operational amplifier OPA only uses a positive (+) power source, the infrared signal is inversely amplified by the resistors R11 and R12 when the capacitor C4 conducts the discharging, and the inversely amplified signal comes to have a positive (+) value.

The voltage amplified by the operational amplifier OPA is supplied to the non-inverting terminal (+) of the comparator COM through a resistor R14 to thereby be compared with the battery voltage Vbt supplied to an inverting terminal (−) through the partial pressure resistors R15 and R16 by way of activation of the transistor TR3.

Accordingly, the voltage output from the comparator COM is supplied to a base terminal of the transistor TR4 through partial pressure resistors R18 and R19 to thereby render the transistor TR4 conductive.

The turned-on signal of the transistor TR4 is supplied to the trigger terminal Trig of the multivibrator 721 where the signal maintains a high level for a period determined by a resistor R9 and the capacitor C3.

Meanwhile, the transistor is rendered conductive when the rectangular wave signal output from the output terminal OUT of the multivibrator 721 maintains a high level.

At this time, when the turned-on signal of the transistor TR5 is supplied to a transmission start terminal TE of the code establisher 741, the establisher 741 outputs a code pulse signal (whose waveform is illustrated in FIG. 7) to the code modulating unit 75 through the output terminal OUT according to the intrinsic code data predetermined at the code establishing terminals (A1–A9) by the user.

Figures 6A, 6B, 6C:
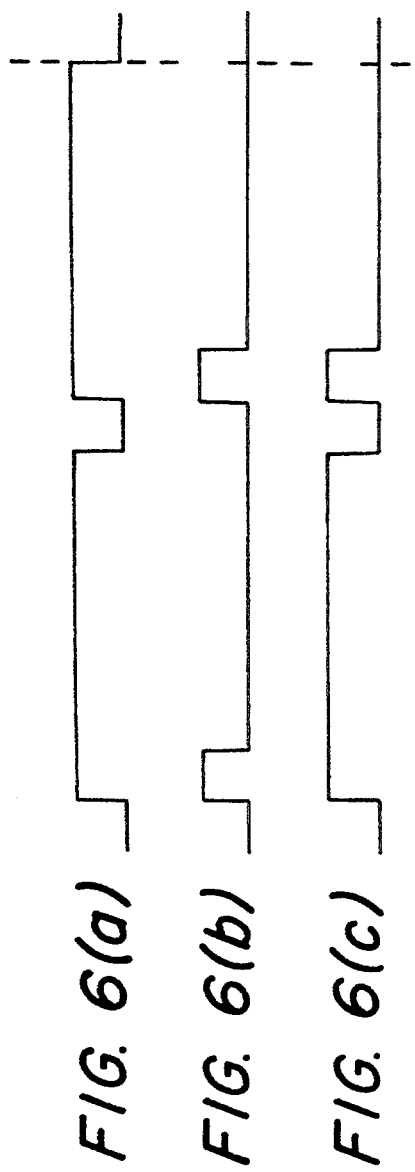
FIGS. 6(a)-6(c) are an output waveform diagram of a code establishment unit applied to the present invention.

At this time, a code pulse signal (whose waveform is illustrated in FIG. 6a) is generated because this is the case where an intrinsic code data is "1" when the code establishing terminals (A1–A9) are connected to a contact (n1), and when the code establishing terminal (A1–A9) is connected to a contact (n2), a code pulse signal (whose waveform is illustrated in FIG. 6b) is generated because this is the case where the intrinsic code data is "0".

Furthermore, when the code establishing terminal (A1–A9) is connected to a contact (n3), a code pulse signal (whose waveform is illustrated in FIG. 6c) is generated bacause this is the case where the intrinsic code data is "open".

In other words, the code pulse signals (whose waveforms as per illustration in FIGS. 6a, 6b and 6c) are output through the output terminal OUT as per the user's establishment, according to the intrinsic code data pre-established at the code establishing terminals (A1–A9).

Figures 7A, 7B, 7C, 7D:
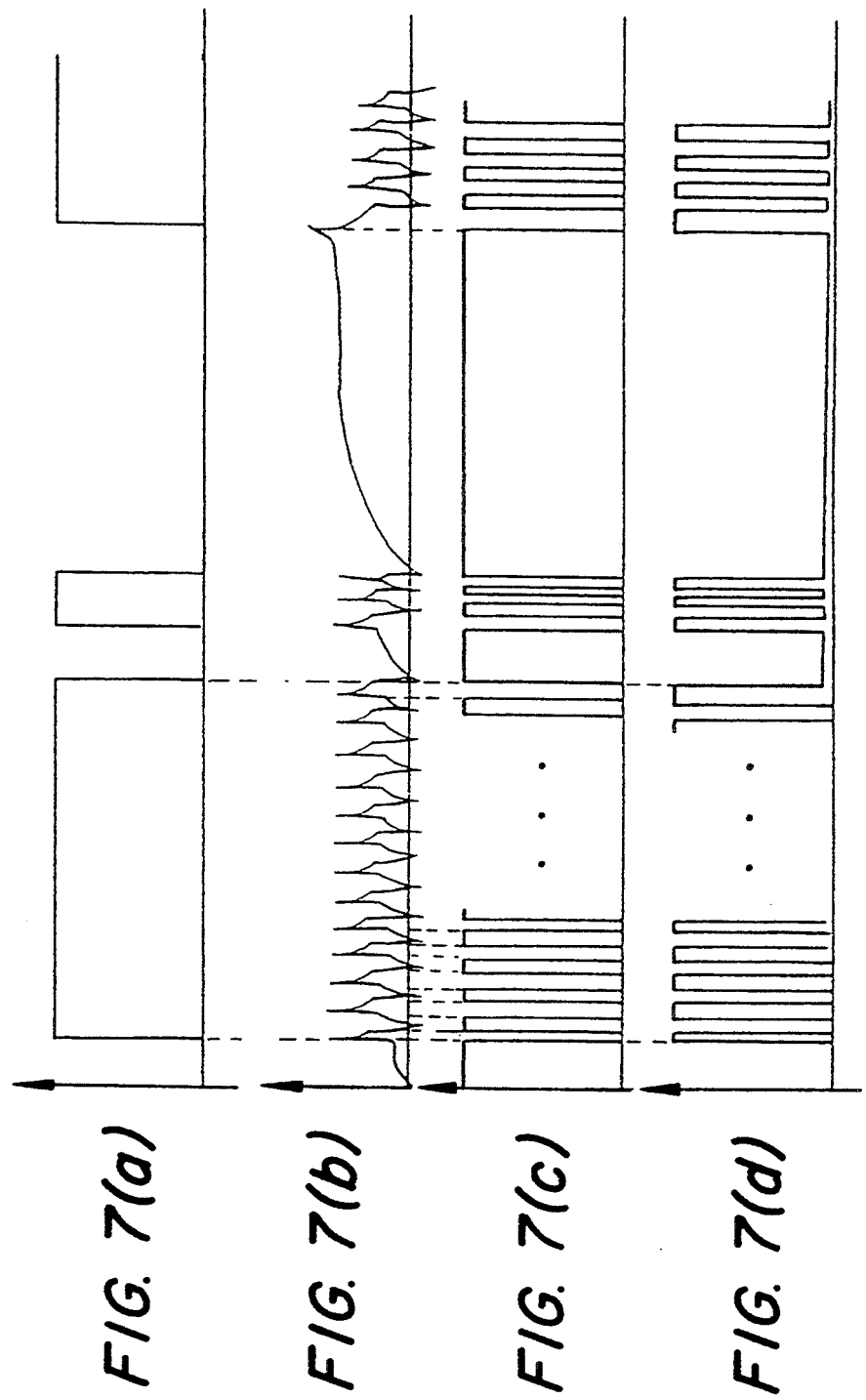
FIGS. 7(a)-7(d) are an output waveform diagram of a code modulation unit applied to the present invention.

Accordingly, an input signal of NAND gate 753 is charged or discharged in the waveform as illustrated in FIG. 7b according to time constants of a resistor R26 and a capacitor C6, when the code pulse signal is in high level at the code modulating unit 75 according to the code pulse signal whose waveform is illustrated in FIG. 7a.

The waveform in FIG. 7b conducts a self-excited oscillation in a waveform illustrated in FIG. 7c according to logic of output terminals in NAND gates 754 and 755 and input terminal voltage of NAND gate 753.

Furthermore, an output pulse of the NAND date 755 is inverted at the NAND gate 752 to thereby be supplied to the infrared transmitting unit 76 in a waveform illustrated in FIG. 7d.

In other words, at the code modulating unit 75, the intrinsic code data (whose waveform is illustrated in FIG. 7a) output from the output terminal OUT of the code establisher 741 is finally modulated in the waveform illustrated in FIG. 7d.

Accordingly, the transistor TR6 of the infrared transmitting unit 76 receives the intrinsic code signal modulated by the code modulating unit 75 through a resistor R27 to thereby render the intrinsic code signal input to the infrared transmitting unit 76 conductive during a period of high level thereof.

When the transistor TR6 is rendered conductive, a transistor TR7 is rendered conductive to thereby amplify the current by way of receipt of the battery voltage Vbt through a resistor R29.

When the transistor TR7 is turned on, the infrared diode (IR-LED) receives at an anode terminal a voltage Vcc supplied from the outside through a resistor R30 to thereby emit light, so that the infrared signal can be transmitted to the infrared transmitting/receiving means 60, which receives the intrinsic code signal output from the position correcting means 70 to thereby output the same to the control means 10.

Accordingly, the control means 10 receives the intrinsic code data of the position correcting means 70 input through the infrared transmitting/receiving means 60, to thereafter compare the position coordinate data pre-established according to a corresponding intrinsic code thereof with current position data operated during a period when the robot 1 reaches the position correcting means 70.

As a result of the comparison, if there is any error in the present position data of the robot 1, the control means 50 corrects the present position data by a pre-established position coordinate data to thereby cause the robot 1 to move to the targeted point accurately.

At this time, the distance detecting means 80 mounted on one side surface of the robot 1 detects a separated distance between the robot 1 and the wall surface (Ws) disposed at the position correcting means 70 to thereby cause the robot 1 to travel on a route, maintaining a predetermined distance from the wall surface (Ws), so that the position error of the robot 1 can be accurately corrected.

As seen from the foregoing, according to the mobile robot of the present invention, the position error data generated in the travel of the robot is corrected by the predetermined position coordinate data to thereby cause the robot to move to the targeted area accurately, and at the same time, the mobile robot has a simple structure to thereby enable easy installment and to reduce cost in the manufacturing thereof.

The mobile robot according to the present invention also has an excellent effect of reducing electric consumption needed for position error correction of the robot by way of correction of the position error data only when the infrared signal is received from the robot.

Having described specific preferred embodiments of the invention with reference to the accompanying drawings, it is to be understood that the invention is not limited to those precise embodiments, and that various changes and modifications may be effected therein by one skilled in the art without departing from the scope of spirit of the invention as defined in the appended claims.

What is claimed is:

1. A mobile robot system comprising:

a mobile robot including control means for controlling operation of the robot, driving means for moving the robot according to control of the control means, and infrared signal transmitting/receiving means for transmitting and/or receiving an infrared signal in the course of travel of the robot; and position correcting means separated from said mobile robot for receiving the infrared signal from the infrared signal transmitting/receiving means and for sending an intrinsic code signal to the infrared signal transmitting/receiving means, said position correcting means including an infrared receiving unit for receiving the infrared signal transmitted from the infrared signal transmitting/receiving means;

a trigger generating unit for generating a trigger signal according to the infrared signal received at the infrared receiving unit;

a code establishing unit for receiving a voltage supplied from a power supply unit to thereby output intrinsic code data characteristic of the position correcting means as predetermined by a user;

a code modulating unit for modulating the intrinsic code data output from the code establishing unit; and an infrared transmitting unit for receiving and amplifying the intrinsic code signal modulated by the code modulating unit to thereby transmit the amplified intrinsic code signal to the infrared transmitting/receiving means, said mobile robot further including distance detecting means for detecting a separation distance from the position correcting means in order to output separation distance data detected therefrom to the control means, said control means correcting a position error on the basis of said intrinsic code signal and said separation distance data.

2. A mobile robot system as defined in claim 1, wherein the infrared receiving unit comprises:

a photo-transistor which is turned on by receiving the infrared signal transmitted from the infrared signal transmitting/receiving means; and a resistor for limiting a current component to protect the photo-transistor during activation of the same.

3. A mobile robot system as defined in claim 1, wherein the power supply unit comprises:

a first capacitor for filtering a direct current component contained in a battery voltage during activation of a photo-transistor of the infrared receiving unit;

a first transistor which is turned on by receiving the battery voltage filtered by the capacitor;

a second capacitor which is charged by receiving the battery voltage during activation of the first transistor;

a second transistor which is turned on by the voltage charged at the second capacitor during activation of the first transistor;

a third transistor which is turned on by receiving the battery voltage during activation of the second transistor;

a multivibrator for receiving the battery voltage and a pulse signal output from the trigger generating unit during activation of the third transistor to thereby generate a rectangular wave signal;

a first resistor and a third capacitor for determining an oscillating frequency of the multivibrator;

a diode for performing a half-wave rectification on the rectangular wave signal generated from the multivibrator; and a second resistor for limiting the current component contained in the rectangular wave signal half-wave rectified by the diode.

4. A mobile robot system as defined in claim 1, wherein the code establishing unit comprises:

a transistor which is rendered conductive by receiving a rectangular wave signal from the power supply unit;

a code establisher for receiving a battery voltage during activation of the transistor to thereby output a code pulse signal according to the intrinsic code data previously established by the user; and first and second resistors and a capacitor for determining an oscillating frequency of the code establisher.

5. A mobile robot system as defined in claim 1, wherein the code modulating unit comprises:

an oscillator for modulating a code pulse signal output from the code establishing unit, so that the signal can be transmitted over a long distance at a low electric power consumption; and a buffer NAND gate for inverting an output pulse of the oscillator.

6. A mobile robot system as defined in claim 1, wherein the infrared transmitting unit comprises:

a Darlington circuit for receiving the intrinsic code signal modulated at the code modulating unit to thereby amplify the same; and an infrared diode for generating infrared radiation by receiving a battery voltage during activation of the Darlington circuit.

7. A mobile robot system as defined in claim 1, wherein the trigger generating unit comprises:

a capacitor for filtering a direct current component of an externally supplied voltage during activation of a photo-transistor of the infrared receiving unit;

an amplifying circuit for amplifying the voltage filtered by the capacitor;

a comparative circuit for receiving the voltage amplified by the amplifying circuit and a reference voltage output from the power supply unit to thereafter compare the same; and a transistor for receiving the voltage compared at the comparative circuit to thereby be rendered conductive.

8. A mobile robot as defined in claim 7, wherein the amplifying circuit comprises:

an operational amplifier for amplifying the voltage filtered by the capacitor; and a resistor for feeding the voltage amplified at the operational amplifier back to the operational amplifier.

9. A mobile robot system as defined in claim 7, wherein the comparative circuit comprises:

a comparator for comparing the amplified voltage of the amplifying circuit with the reference voltage from the power supply unit; and a resistor for feeding back the output voltage compared at the comparator.

* * * * *